United States Patent [19]

Bachmann et al.

[11] Patent Number: 4,976,509
[45] Date of Patent: Dec. 11, 1990

[54] FLEXIBLE ELECTRICAL CONTROL CABLE

[75] Inventors: Andreas Bachmann, Sonnefeld; Arnd-Günther Carl, Neustadt B. CBG, both of Fed. Rep. of Germany

[73] Assignee: Siemens Aktiengesellschaft, Berlin & Munich, Fed. Rep. of Germany

[21] Appl. No.: 452,574

[22] Filed: Dec. 18, 1989

[30] Foreign Application Priority Data

Aug. 16, 1989 [DE] Fed. Rep. of Germany ... 8909962[U]

[51] Int. Cl.$^5$ ................................................. G02B 6/44
[52] U.S. Cl. ................................................. 350/96.23
[58] Field of Search ..................................... 350/96.23

[56] References Cited

U.S. PATENT DOCUMENTS

| | | | |
|---|---|---|---|
| 4,552,432 | 11/1985 | Anderson et al. | 350/96.23 |
| 4,575,194 | 3/1986 | Ueno et al. | 350/96.23 |
| 4,657,342 | 4/1987 | Bauer | 350/96.23 |
| 4,687,294 | 8/1987 | Angeles | 350/96.23 |
| 4,804,245 | 2/1989 | Katayose et al. | 350/96.23 |
| 4,898,451 | 2/1990 | Story | 350/96.23 |

Primary Examiner—John D. Lee
Assistant Examiner—Robert E. Wise
Attorney, Agent, or Firm—Kenyon & Kenyon

[57] ABSTRACT

In order to improve a multi-conductor control cable comprising conductor bundles utilized in container loading devices (spreader cables) so that it can transmit video signals, a stranded unit is provided in place of a conductor bundle. This stranded unit consists of only four stranded elements: an optical waveguide cable; a stranded element with a diameter equal to the diameter of the optical waveguide cable; and two additional stranded elements of smaller diameter.

3 Claims, 1 Drawing Sheet

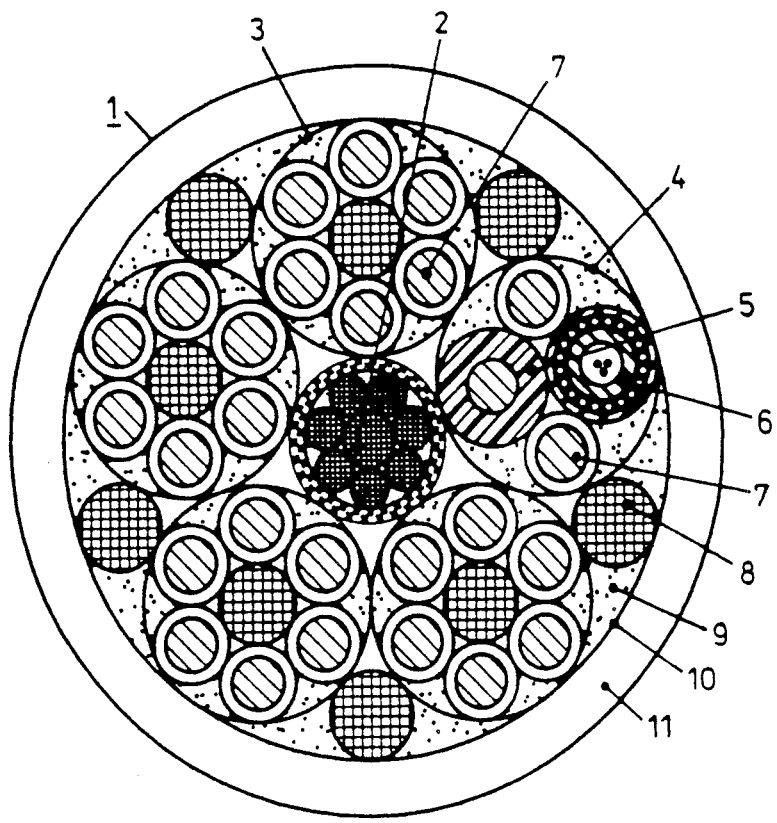

FLEXIBLE ELECTRICAL CONTROL CABLE

BACKGROUND OF THE INVENTION

The present invention relates to flexible electrical cables generally, and more particularly to the construction of a control cable that is utilized in container loading devices (spreader cables).

A control cable is disclosed in EP-PS No. 0 178 249. This control cable contains several conductor bundles that are supported on a core element. In order to improve the physical conductability of such a cable when it experiences forces resulting from wind, the central supporting member of the cable comprises a binding of braided lead cords onto which a mesh of high-tensile strength plastic filaments has been applied. The conductor bundles each contain as a core element a braided lead cord. These braided lead cords are also arranged in the interstices between the conductor bundles.

The control cable of the prior art cannot transmit signals of large bandwidth, particularly video signals. Thus, there is a need to modify such known control cables so that they can transmit signals of larger bandwidths, particularly video signals.

SUMMARY OF THE INVENTION

According to the present invention, this task is accomplished by providing a flexible electrical control cable comprising several conductor bundles supported on a central supporting member with braided lead cords arranged in the interstices between the conductor bundles. One of the conductor bundles is made up of four stranded elements, which include one optical waveguide cable, one stranded element with a diameter equal to that of the optical waveguide cable, and two stranded elements with smaller diameters. Consequently, an optical transmission element can be incorporated into the control cable without altering the fundamental structural design of the control cable.

In the embodiment of the invention herein described the fiber optic cables are designed as hollow-core conductors containing several optical waveguide cables. These types of cables are disclosed in the German Published Patent Application No. 25 56 861 and DE AS No. 26 28 069. They consist essentially of a plastic tubing within which several optical waveguide cables are loosely arranged. A high tensile strength mesh encloses the plastic covering, which itself is enclosed by an outersheath.

In the design of a control cable according to the invention, one conductor bundle contains two stranded elements that each have a diameter equal to half the diameter of the conductor bundle. Two additional stranded elements with smaller diameters are also contained within this conductor bundle. All the non-optical stranded elements are electrical control wires. The one control wire that has the same diameter as the optical waveguide cable has thicker insulation than the other control wires in order to achieve this larger diameter.

BRIEF DESCRIPTION OF THE DRAWING

The single FIGURE is a cross-sectional view of the flexible electrical control cable of the present invention.

DETAILED DESCRIPTION

Referring to the drawing, control cable 1 comprises a central supporting member 2 on which five conductor bundles are supported. Four of the conductor bundles 3, which do not contain an optical waveguide cable, are of the type known in the art and contain six control wires 7 that are twisted around a lead cord. The conductor bundle 4 includes one optical waveguide cable 6, one thickened electrical control wire 5 with a diameter equal to that of the optical waveguide cable 6, and two normal electrical control wires 7. Braided lead cords 8 and a filler 9 are arranged in the interstices between the conductor bundles. At the outside, the cable is surrounded by a braided core covering 10 with an outer sheath 11 surrounding the braided core covering 10.

The optical waveguide cable 6 includes a plastic tubing. Within the plastic tubing, three optical waveguide cables are loosely arranged. A high tensile strength braided covering and an outer sheath, enclose the plastic tubing. As noted previously, such waveguide cables are well known in the art.

What is claimed is:

1. A flexible electrical control cable comprising:
   (a) central supporting member;
   (b) a plurality of conductor bundles surrounding said central supporting member with interstices between said conductor bundles, at least one of said conductor bundles comprising four elements stranded together, said elements including an optical waveguide cable, a stranded element with a diameter equal to the diameter of said optical waveguide cable and two stranded elements with diameters smaller than the diameter of said optical waveguide cable; and
   (c) braided lead cords arranged in the interstices between the conductor bundles.

2. The control cable of claim 1, wherein said optical waveguide cable comprises a hollow core conductor and a plurality of optical waveguide cables contained therein.

3. The control cable of claim 2, wherein the non-optical stranded elements comprise insulated electrical control wires, the control wire with a diameter equal to the diameter of said optical waveguide cable being provided with a thickened conductor insulation.

* * * * *